(12) United States Patent
Agrawal (10) Patent No.: US 12,113,661 B2
(45) Date of Patent: Oct. 8, 2024

(54) SYSTEM, METHOD, AND NON-TRANSITORY COMPUTER-READABLE MEDIA FOR DEFINING LOGICAL DEPENDENCY OF ALARM ATTRIBUTES

(71) Applicant: Rakuten Mobile, Inc., Tokyo (JP)

(72) Inventor: Amit Agrawal, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/907,539

(22) PCT Filed: Jul. 29, 2022

(86) PCT No.: PCT/US2022/038794
§ 371 (c)(1),
(2) Date: Sep. 28, 2022

(87) PCT Pub. No.: WO2024/025549
PCT Pub. Date: Feb. 1, 2024

(65) Prior Publication Data
US 2024/0214259 A1 Jun. 27, 2024

(51) Int. Cl.
*H04L 41/069* (2022.01)
*H04L 41/0604* (2022.01)
*H04L 41/12* (2022.01)
*H04L 12/24* (2006.01)
*H04L 12/26* (2006.01)
*H04L 43/04* (2022.01)

(52) U.S. Cl.
CPC ...... *H04L 41/0609* (2013.01); *H04L 41/0613* (2013.01)

(58) Field of Classification Search
CPC .......... H04L 41/0609; H04L 41/0613; H04L 41/069; H04L 41/12; H04L 41/065; H04L 43/04; H04L 12/24; H04L 12/26
USPC ........................................................ 709/224
See application file for complete search history.

(56) References Cited

U.S. PATENT DOCUMENTS

| | | | |
|---|---|---|---|
| 2015/0066435 A1* | 3/2015 | Basu ...................... | G01R 31/40 702/189 |
| 2016/0218911 A1* | 7/2016 | Wessels ................ | H04L 43/045 |
| 2022/0086036 A1* | 3/2022 | Wang .................. | H04L 41/0636 |

* cited by examiner

*Primary Examiner* — Jude Jean Gilles
(74) *Attorney, Agent, or Firm* — HAUPTMAN HAM, LLP (57) ABSTRACT

Logical dependencies are defined between alarm attributes. Alarm attributes associated with a mobile network are obtained. Dependencies between the alarm attributes are defined. At a network management system, alarms occurring in the mobile network are received. The dependencies are applied to the alarm attributes of alarms received at the network management system to generate defined combinations of the alarm attributes for the alarms. The alarms are presented on a user interface to address faults associated with the alarms based on the defined combination of alarm attributes.

20 Claims, 9 Drawing Sheets

| | |
|---|---|
| Technology | LTE |
| Classification | Outage |
| Severity | Alarm Count |
| Critical | 2,726 |
| Major | 287 |
| Minor | 199 |
| Warning | 28 |
| Info | 22 |
| Grand Total | 3,263 |

Classification is "Outage", but Severity includes "Minor", "Warning", or "Info", which is inconsistent

540

| | |
|---|---|
| Technology | LTE |
| Classification | Outage |
| Severity | Alarm Count |
| Info | 8,567 |
| Warning | 2,336 |
| Minor | 1,416 |
| Major | 1,214 |
| Critical | 454 |
| Grand Total | 13,994 |

Classification is "Notification", but Severity includes "Major" or "Critical", which is inconsistent

570

| | |
|---|---|
| Technology | LTE |
| Classification | Outage |
| Severity | Alarm Count |
| Critical | 37 |
| Info | 19 |
| Major | 29 |
| Minor | 4 |
| Grand Total | 89 |

Classification is "Outage", but Severity includes "Info", "Major", or "Minor", which is inconsistent

SYSTEM, METHOD, AND NON-TRANSITORY COMPUTER-READABLE MEDIA FOR DEFINING LOGICAL DEPENDENCY OF ALARM ATTRIBUTES

RELATED APPLICATIONS

The present application is a National Phase of International Application No. PCT/US2022/038794, filed Jul. 29, 2022.

TECHNICAL FIELD

This description relates to a system, method, and non-transitory computer-readable media for defining logical dependency of alarm attributes.

BACKGROUND

In a telecom environment, an "alarm" is generated for a wide variety of reasons. In response to a severity of an alarms being minor, a regular maintenance visit to the cause of the alarm is scheduled. More serious alarms, such as major and critical alarms are to be given an immediate response. An immediate response is scheduled because the integrity of the network is severely at risk.

The collection and aggregation of alarms is handled by computers and a combined, list of alarms is displayed for human staff to process. Modern telecommunication networks produce thousands of alarms per day thereby making the task of real-time network surveillance and fault management difficult. Due to the large volume of alarms, network operators frequently overlook or misinterpret them. To reduce the number of alarms displayed on operators' terminals, current network management systems apply alarm filtering procedures or send them directly to a printer or database.

Currently, alarm attributes are defined independently for each alarm, which leaves individual developers/specification writers/solution architects (herein referred to as just developers) to choose inconsistent combinations. The inconsistency between alarm attributes prevent a consistent urgency level being assigned to alarms.

SUMMARY

In at least embodiment, a method for defining logical dependency of alarm attributes includes obtaining alarm attributes associated with a mobile network, defining dependencies between the alarm attributes, receiving, at a network management system, alarms occurring in the mobile network, applying dependencies to the alarm attributes of alarms received at the network management system to generate defined combinations of the alarm attributes for the alarms, and presenting the alarms to address faults associated with the alarms based on the defined combination of alarm attributes.

In at least embodiment, a device for defining logical dependency of alarm attributes includes a memory storing computer-readable instructions, and a processor connected to the memory, wherein the processor is configured to execute the computer-readable instructions to obtain alarm attributes associated with a mobile network, define dependencies between the alarm attributes, receive, at a network management system, alarms occurring in the mobile network, apply dependencies to the alarm attributes of alarms received at the network management system to generate defined combinations of the alarm attributes for the alarms, and present the alarms to address faults associated with the alarms based on the defined combination of alarm attributes.

In at least embodiment, a non-transitory computer-readable media having computer-readable instructions stored thereon, which in response to being executed by a processor causes the processor to perform operations including obtaining alarm attributes associated with a mobile network, defining dependencies between the alarm attributes, receiving, at a network management system, alarms occurring in the mobile network, applying dependencies to the alarm attributes of alarms received at the network management system to generate defined combinations of the alarm attributes for the alarms, and presenting the alarms to address faults associated with the alarms based on the defined combination of alarm attributes.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

DETAILED DESCRIPTION

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

In a telecom environment, an "alarm" is generated for a wide variety of reasons. Alarm systems also reflect software and hardware failures. Alarms are characterized according to a variety classifications, such as normal, notification, deterioration, and outage. Alarms also are classified based on whether an alarm impacts service, on a severity classification, such as whether the alarm is informational, a warning, of indeterminate nature, and associated with a minor, major, and critical issue. Priorities are also associated with alarms such as whether the priority associated with an alarm is minor, major, critical, and an emergency. According to at least one embodiment, logical dependencies are defined between the attributes to ensure that each alarm is specified with a consistent combination of attributes and that a correct urgency level of the trouble is provided as part of fault management.

Alarm attributes associated with a mobile network are obtained. Dependencies between the alarm attributes are defined. At a network management system, alarms occurring in the mobile network are received. The dependencies are applied to the alarm attributes of alarms received at the network management system to generate defined combinations of the alarm attributes for the alarms. The alarms are presented on a user interface to address faults associated with the alarms based on the defined combination of alarm attributes.

Advantages of providing a logical dependency between the attributes ensures that each alarm is specified with the consistent combination of attributes and that a correct urgency level of the trouble is provided as part of fault management. The logical dependency in attributes also allows automation initiatives to be implemented to provide improved alarm management.

Figure 1:
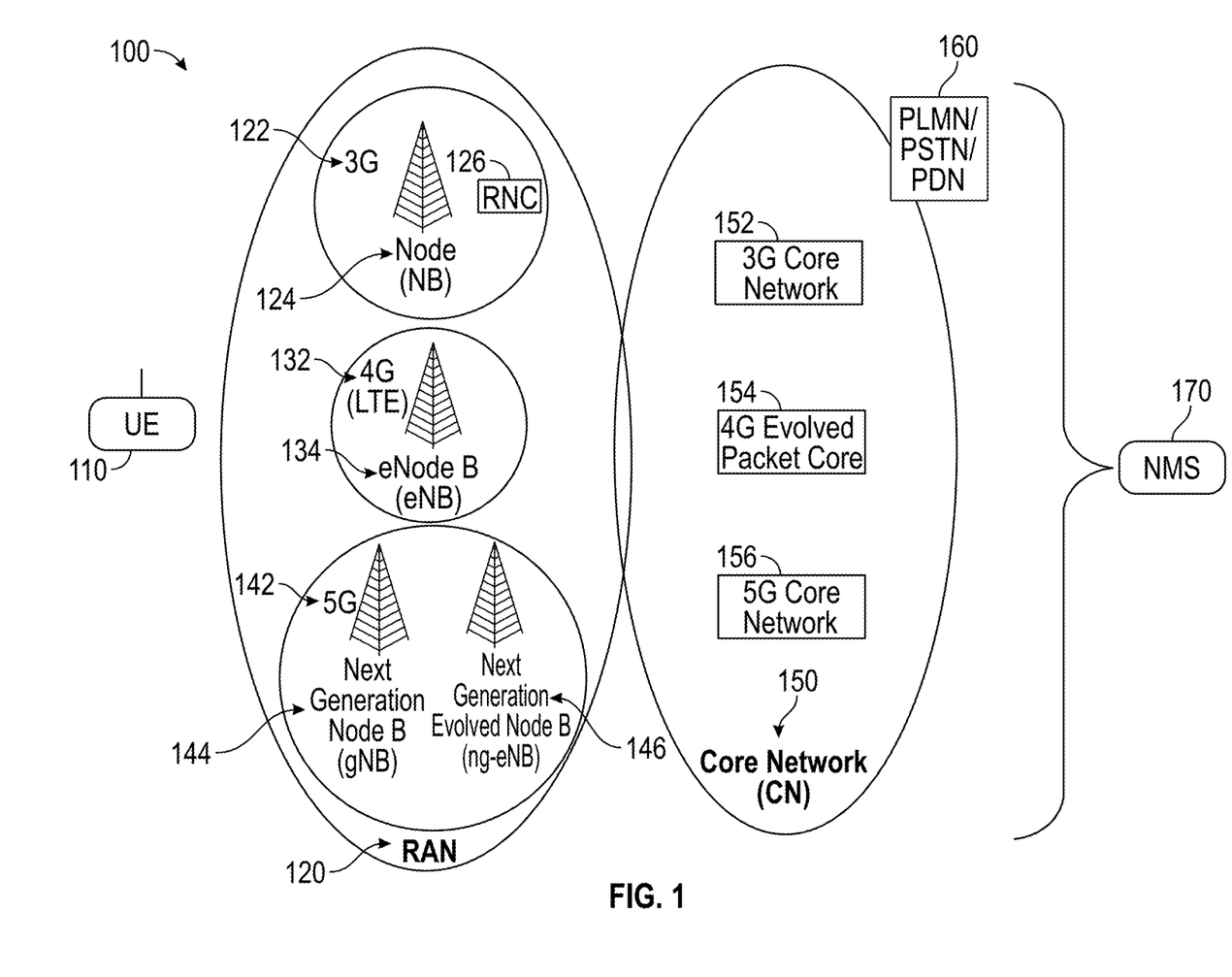
FIG. 1 illustrates a mobile network according to at least one embodiment.

FIG. 1 illustrates a mobile network 100 according to at least one embodiment.

In FIG. 1, a mobile telecommunication network couples User Equipment (EU) 110 through Radio Access Network (RAN) 120 to a Core Network (CN) 150. RAN 120 connects individual devices, such as User Equipment (EU) 110 to other parts of a network, e.g., CN 150, through radio connections. RAN 120 is responsible for managing radio resources, including strategies and algorithms for controlling power, channel allocation and data rate.

In a 3G network 122, RAN 120 includes the base station, which is called a Node B (NB) 124, and a Radio Network Controller (RNC) 126. RNC 126 controls and manages the radio transceivers in Node Bs 124, as well as manages operational functions, such as handoffs, and the radio channels. The RNC 126 handles communication with the 3G Core Network 152.

In a 4G (LTE) network 132, the Evolved Node B (eNodeB or eNB) 134 is the radio base station. The eNodeB 134 is able to perform the radio access functions that are equivalent to the combined work that Node B and RNC do in 3G and connect to the Evolved Packet Core 154.

In a 5G network 142, there are two types of radio base station nodes: Next Generation Node B (gNodeB) 144 and Next Generation Evolved Node B (ng-eNB) 146. The ng-eNB 146 is an enhanced version of 4G eNodeB and connects 5G UE 110 to the 5G Core Network (5GC) 156 using 4G LTE air interface. The gNB 144 allows 5G UE 110 to connect with a 5GC 156 using 5G NR air interface. The gNBs 144 and ng-eNBs 146 are interconnected with each other by means of the Xn interface. The gNBs 144 and ng-eNBs 146 are also connected by means of the NG interfaces to the 5GC 156.

Core Network (CN) 150 connects RAN 120 to networks 160, such as a Public Landline Mobile Network (PLMN), a Public Switched Telephone Network (PSTN) and a Packet Data Network (PDN). CN 150 provides high-level traffic aggregation, routing, call control/switching, user authentication and charging. The 3G CN 152 involves two different domains: circuit switched elements and packet switched elements. The 4G Evolved Packet Core (EPC) 154 includes four main network elements: the Serving Gateway (S-GW), the packet data network (PDN) Gateway (P-GW), the mobility management entity (MME), and the Home Subscriber Server (HSS). The S-GW routes and forwards data packets from the UE and acts as the mobility anchor during inter-eNodeB handovers. The P-GW acts as an ingress and egress point to the EPC from a PDN (Packet Data Network) such as the Internet. The MME manages UE access network and mobility, as well as establishing the bearer path for User Equipment (UE). The MME is also concerned with the bearer activation/deactivation process. The HSS is the master database for a given subscriber, acting as a central repository of information for network nodes. Subscriber related information held by the HSS includes user identification, security, location, and subscription profile. The EPC is connected to the external networks, which includes the IP Multimedia Core Network Subsystem (IMS). 5GC 156 supports new network functions (NFs) associated with the packet core and user data management domains. 5GC 156 provides a decomposed network architecture with the introduction of a service-based interface (SBI), and control plane and user plane separation (CUPS). 5GC decomposes the 4G MME into an Access and Mobility Management Function (AMF) and a Session Management Function (SMF). The AMF receives connection and session related information from the UE, but is responsible for handling connection and mobility management tasks. Messages related to session management are forwarded to the SMF.

The network is managed by the network management system (NMS) 170, which provides several network management functionalities. One of the primary functions of the NMS is fault management, where diagnosing and addressing network faults takes place.

Figure 2:
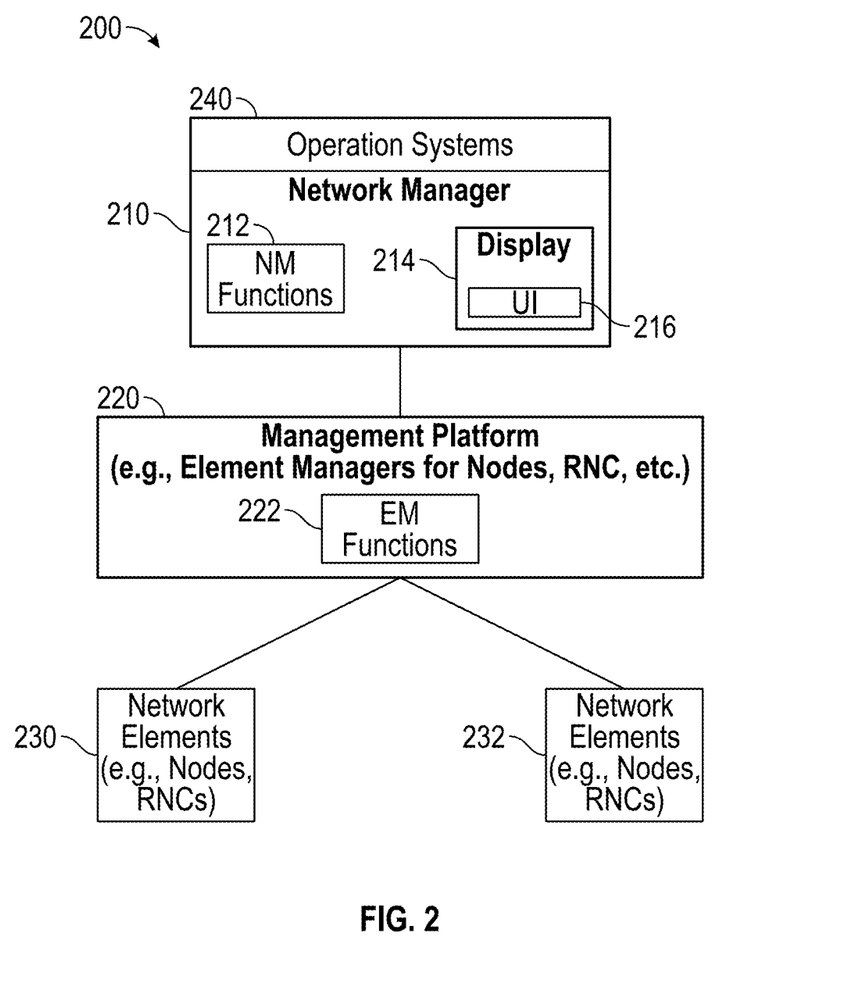
FIG. 2 illustrates a network management system according to at least one embodiment.

FIG. 2 illustrates a network management system 200 according to at least one embodiment.

In FIG. 2, a Network Manager (NM) 210 is coupled to at least one Element Manager (EM) 220. An EM 220 is coupled to at least one Network Element (NE) 230.

NM 210 provides NM functions 212 for the management of a network that is supported by EM(s) 220. The NM 210 is also involved in direct access to the NEs 230, 232. Communication with the network is based on interfaces supporting management of multivendor and multi-technology NEs 230, 232. An Operations System (OS) 240 provides fault management services and functions used by the operator on top of the element management layer.

EM 220 provides EM functions 222 for management of a set of related types of NEs 230. NEs 230, 232 are discrete telecommunications entities. NEs 230, 232 are managed over a specific interface, e.g., the RNC.

NM 210 receives alarms associated with issues occurring in the mobile network. For example, alarms are able to be identified for one or more of the following categories:

Hardware failures, i.e., the malfunction of some physical resource within a NEs 230, 232.

Software problems, e.g., software bugs, database inconsistencies.

Functional faults, i.e., a failure of some functional resource in NEs 230, 232 and no hardware component is found responsible for the problem.

Loss of some or all of the specified capability of NEs 230, 232 due to overload situations.

Communication failures between NEs 230, 232, or between NEs 230, 232 and NM 210 and Operations System 240.

As a consequence of faults, appropriate alarms related to the physical or logical resource(s) affected by the fault(s), are generated by the network entities. For example, NEs 230, 232 detect faults using autonomous self-check circuits/procedures, including, in the case of NEs 230, 232, the observation of measurements, counters and thresholds. The threshold measurements are predefined by the manufacturer and executed autonomously in NEs 230, 232, or the threshold measurements are based on performance measurements administered by the EM 220.

NM 210 receives alarm attributes that are used to classify alarms. NM 210 classifies alarms according to attributes related to alarm classification, service impact, severity, and priority. A severity level, including whether the alarm is: informational, a warning, of indeterminate nature, and associated with a minor, a major, and a critical issue. Examples of criteria for setting the alarm severity to "critical" include consideration of the total disturbance of the system or significant service impact for customers, and performance, capacity, throughput restrictions, and disturbance of accounting information. Examples of criteria for setting the alarm severity to "major" include consideration of outage of a redundant component (e.g., outage of a redundant power supply), and introduction of retaliatory actions to implement, to ensure the service availability. Criteria is defined for the other severity levels. For Fault Management (FM) purposes, NEs 230, 232 store and retain a list of active alarms, i.e., alarms that have not yet been cleared, and alarm history information, i.e., notifications related to the occurrence and clearing of alarms.

NM 210 characterizes faults by at least one of events, event correlation, root causes, errors, failures or faults, and symptoms. An event is a condition occurring in the operation of hardware or software within the network managed; an instantaneous occurrence at a time. Event correlation is the process of establishing relationships between network events. Root causes are events that cause other events but are not caused by other events; they are associated with an abnormal state of network infrastructure. An error is a discrepancy between an observed or computed value or condition and a true value or condition, assumed to be correct. A failure or fault is considered to be network error. Symptoms are external manifestations of failures (errors) which are observed as alarms.

NM 210 supports fault diagnosis, which involves three processes: fault detection, fault localization (also known as fault isolation or root cause analysis) and testing the possible solutions. Fault detection is the process of collecting information related to malfunctions of the NEs 230, 232 in the form of alarms. In at least one embodiment, NM 210 includes a Display 214 that presents a User Interface (UI) 216, wherein alarms are automatically presented on the UI 216 upon detection. Fault localization or root cause analysis (RCA) is the process of identifying the causes of faults. RCA includes several stages of correlating events (including alarms) which occurred over a certain period of time, and is based on technical knowledge about the system being analyzed. Alarm correlation is the process of grouping alarms which refer to the same problem, in order to highlight those which indicate the possible root cause.

Figure 3:
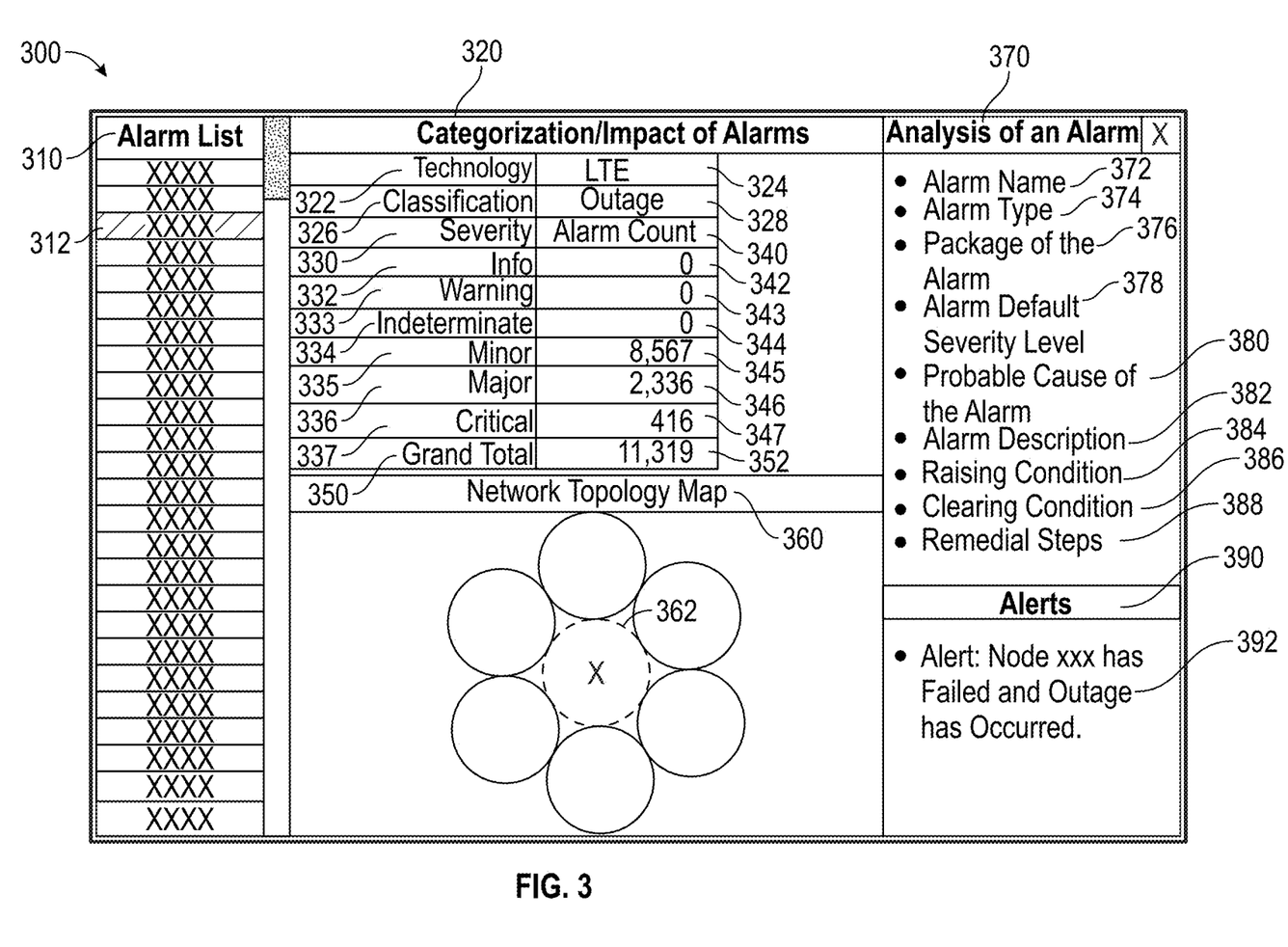
FIG. 3 illustrates an Alarm Management User Interface (UI) according to at least one embodiment.

FIG. 3 illustrates an Alarm Management User Interface (UI) 300 according to at least one embodiment.

In FIG. 3, the Alarm Management User Interface 300 includes an Alarm List UI 310, a Categorization/Impact of Alarms UI 320, a Network Topology Map 360, and Analysis of An Alarm UI 370. In response to receiving an alarm, the alarm is added to an alarm table. From the alarm table, alarms are presented in the Alarm List UI 310. In at least one embodiment, Alarm List 310 automatically displays alarms upon detection.

The rate of alarms being received is able to be several dozen alarms per second. Usually, failures related to one network element cause other network components to send relevant alarms as well. Additional troubleshooting difficulty in a complex system like a mobile telecommunication network stems from the number of network elements, as well as from their geographical distribution. Further, one problem triggers a string of alarms for related network elements. In response to outage of critical network elements occurring, the network management system is flooded by large quantities of alarms. In these conditions, the operator has very limited time to diagnose what and where has happened. In Alarm List UI 310, a selected alarm 312 is shown.

The Categorization/Impact of Alarms UI 320 provides information associated with alarms for diagnosing and addressing issues associated with the alarms. For example, Categorization/Impact of Alarms UI 320 shows information associated with selected alarm 312. In at least one embodiment, Categorization/Impact of Alarms UI 320 automatically displays information associated with selected alarm 312. Categorization/Impact of Alarms UI 320 shows alarms that are characterized according to a variety classifications, such as normal, notification, deterioration, and outage. Alarms also are classified based on whether an alarm impacts service, on a severity classification, such as whether the alarm is informational, a warning, of indeterminate nature, and associated with a minor, major, and critical issue. Priorities are also associated with alarms such as whether the priority associated with an alarm is minor, major, critical, and an emergency. In at least one embodiment, a logical dependency is provided among attributes of alarms, e.g., alarm classification, service impact of an alarm, severity of an alarm, and priority to give to an alarm.

Categorization/Impact of Alarms UI 320, a Technology 322 identified as LTE 324 is associated with the alarm. The Classification 326 is identified as a Outage 328. A Severity level 330 for the alarm is maintained according to an Alarm Count 340 for the severity levels.

In FIG. 3, Severity level "Info" 332 has an alarm count of "0" 342. Severity level "Warning" 333 has an alarm count of "0" 343. Severity level "Indeterminate" 334 has an alarm count of "0" 344. Severity level "Minor" 335 has an alarm count of "8,567" 345. Severity level "Major" 336 has an alarm count of "2,336" 346. Severity level "Critical" 337 has an alarm count of "416" 347. A Grand Total 350 for Alarm Counts 340 is "11,319" 352. As explained below, the alarm counts 342-347 under Alarm Count 340 for the Severity levels of "Info" 332, "Warning" 333, "Indeterminate" 334, "Minor" 335, "Major" 336, and "Critical" 337, respectively, are consistent with a Classification 326 that is identified as "Outage" 328. Accordingly, Minor" 335, "Major" 336, and "Critical" 337 severity levels are linked to the classification of "Outage."

The Network Topology Map 360 provides ides a visual map of the physical topology of the mobile network, including the network devices and the links that connect them. The Network Topology Map 360 includes indicators that show the current alarm status of network devices and links. In FIG. 3, Network Topology Map 360 shows a node X 362 has failed. The Network Topology Map 360 enables alarms to be viewed in the context of the interconnection between devices.

Analysis of An Alarm UI 370 presents detailed information associated with an alarm. In at least one embodiment, the detailed information includes the Alarm Name 372 (e.g., equipment degraded), the Alarm Type 374 (e.g., equipment alarm), identification associated with the Package Of The Alarm 376 (e.g., equipment), the Alarm Default Severity Level 378 (e.g., minor, major, critical, emergency), the Probable Cause Of The Alarm 380 (e.g., fan failure), the Alarm Description 382 (e.g., the alarm is raised in response to a fan failing; the chassis attempts to continue operating within the specified temperature range using the remaining fans), a Raising Condition 384, which is a logic statement that describes the internal parameter values that initiate the raising of the alarm, a Clearing Condition 386, which is a logic statement that describes the internal parameter values that initiate the clearing of the alarm, and a statement or series of Remedial Steps 388 as the fault clearance procedure for the alarm, e.g., as recommended by a vendor (e.g., replace the failed fan unit). The above description applies to an example of at least one embodiment of an Alarm Management User Interface (UI) 300. However, an Alarm Management User Interface (UI) 300 according to at least one embodiment is able to provide more, less, or different information.

Alerts UI 390 presents alert information associated with an alarm. In at least one embodiment, an alert is automatically generated based on the information associated with the alarm. As shown in Network Topology Map 360, node X 362 has failed. As shown in Categorization/Impact of Alarms UI 320, the alarm is associated with "Outage" 328. Alerts UI 390 presents an alert based on this information. In FIG. 3, Alert UI 390 shows Alert 392 indicating Node X has failed and an Outage has occurred. Additional or different information is also able to be provided via Alert 392.

Figure 4:
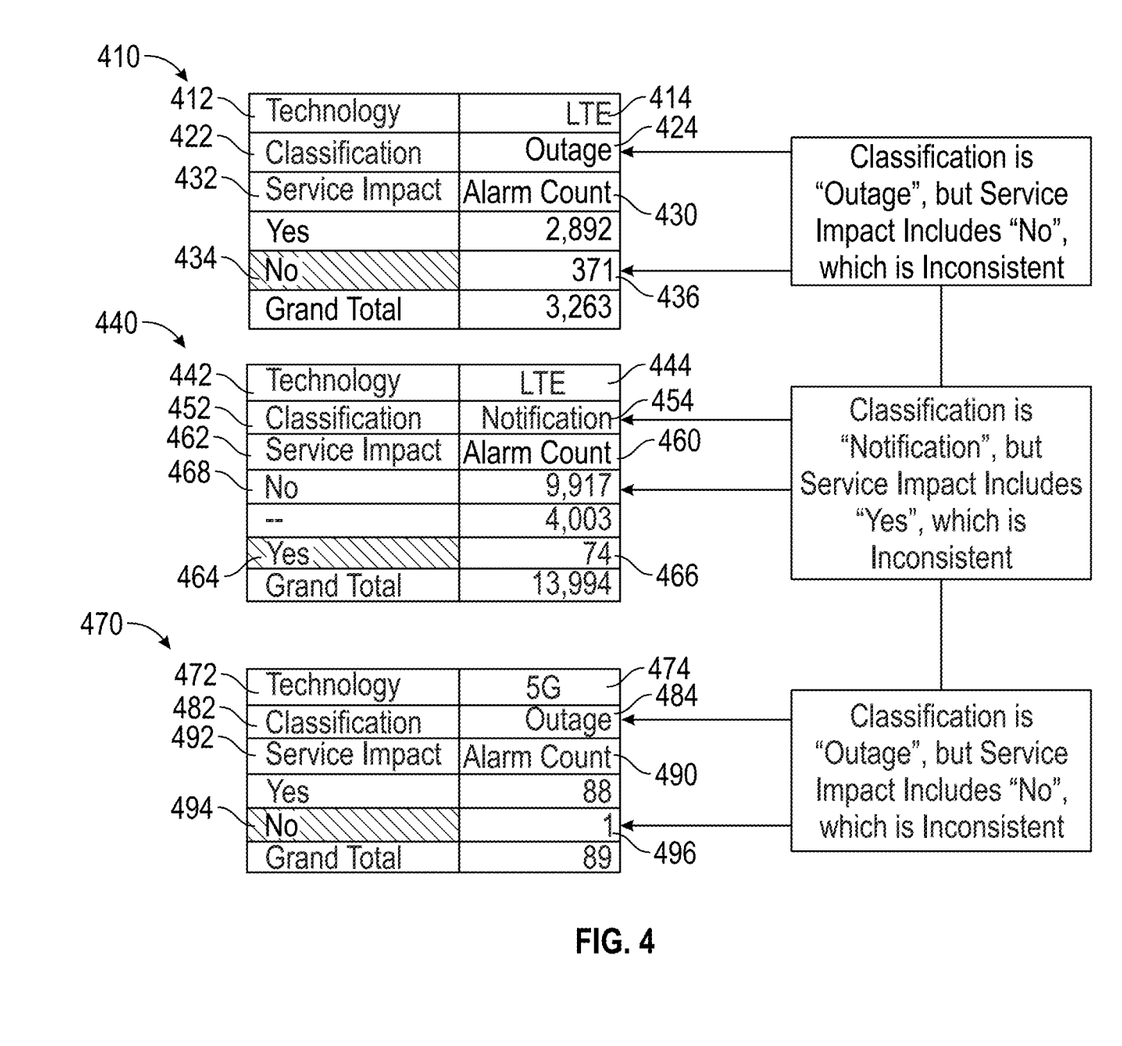
FIG. 4 illustrates inconsistent Classification and Service Impact alarm attributes where a logical dependency is not provided among attributes of alarms.

FIG. 4 illustrates inconsistent Classification and Service Impact alarm attributes 400 where a logical dependency is not provided among attributes of alarms.

Alarms have a Classification of "Normal", "Notification", "Deterioration", and "Outage." herein, a "Normal" Classification refers to operation with specified parameters. The choice for a Service Impact is selected from one of "Yes" and "No." A Severity Level for an alarm is one of "Info", "Warning", "Indeterminate", "Minor", "Major", and "Critical." A Priority for an alarm is one of "Minor", "Major", "Critical", and "Emergency."

In FIG. 4, for a first alarm 410, the Technology 412 is LTE 414. The Classification 422 is "Outage" 424. The Alarm Count 430 for a Service Impact 432 shows "No" 434 having a count of "371" 436. For a second alarm 440, the Technology 442 is LTE 444. The Classification 452 is "Notification" 454. The Alarm Count 460 for a Service Impact 462 shows "Yes" 464 having a count of "74" 466. For a third alarm 470, the Technology 472 is 5G 474. The Classification 482 is "Outage" 484. The Alarm Count 490 for a Service Impact 492 shows "No" 494 having a count of "1" 496.

However, in response to the first alarm 410 causing an "Outage" 424, the choice of "No" 434 for Service Impact 432 is inconsistent. Similarly, in response to the third alarm 470 causing an "Outage" 484, the choice of "No" 494 for Service Impact 492 is inconsistent.

In response to second alarm 440 having a Classification 452 of "Notification" 454, the choice of "Yes" 464 for Service Impact 462 is inconsistent. An alarm having Classification 452 of "Notification" 454 does not cause a Service Impact 462 and the proper choice is "No" 468. Thus, Classification of "Outage" is defined as having Service Impact (i.e., "Yes") and an alarm that causes a Service Impact (i.e., Yes) is not to be "Normal" or "Notification."

By allowing attributes, such as Classification 422, 452, 482 and Service Impact 432, 462,492, to be defined independently, developers are able to choose inconsistent combinations. The inconsistency between alarm attributes prevents a consistent urgency level being assigned to alarms.

Figure 5:
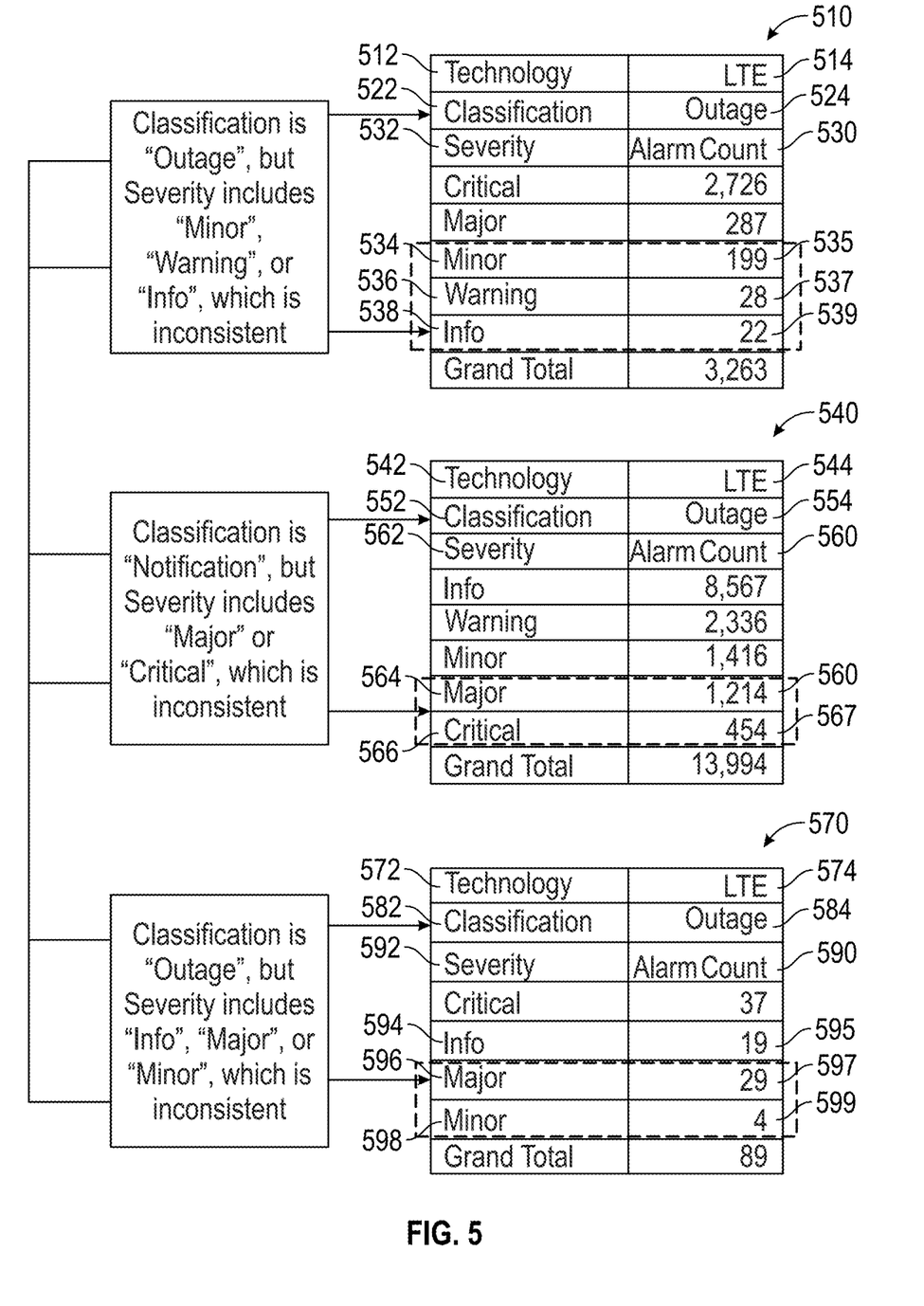
FIG. 5 illustrates inconsistent Classification and Severity attributes where a logical dependency is not provided among attributes of alarms.

FIG. 5 illustrates inconsistent Classification and Severity attributes 500 where a logical dependency is not provided among attributes of alarms.

As described above with reference to FIG. 4, alarms have a Classification of "Normal", "Notification", "Deterioration", and "Outage." The choice for a Service Impact is selected from one of "Yes" and "No." A Severity Level for an alarm is one of "Info", "Warning", "Indeterminate", "Minor", "Major", and "Critical." A Priority for an alarm is one of "Minor", "Major", "Critical", and "Emergency."

In FIG. 5, for a first alarm 510, the Technology 512 is LTE 514. The Classification 522 is "Outage" 524. The Alarm Count 530 for a Severity Level 532 of "Minor" 534 is "199" 535. The Alarm Count 530 for a Severity Level 532 of "Warning" 536 is "28" 537. The Alarm Count 530 for a Severity Level 532 of "Info" 538 is "22" 539.

For a second alarm 540, the Technology 542 is LTE 544. The Classification 552 is "Notification" 554. The Alarm Count 560 for a Severity Level 562 of "Major" 564 is "1,214" 565. The Alarm Count 560 for a Severity Level 562 of "Critical" 566 is "454" 567.

For a third alarm 570, the Technology 572 is LTE 574. The Classification 582 is "Outage" 584. The Alarm Count 590 for a Severity Level 592 of "Info" 594 is "19" 595. The Alarm Count 590 for a Severity Level 592 of "Major" 596 is "29" 597. The Alarm Count 590 for a Severity Level 592 of "Minor" 598 is "4" 599.

However, in response to the first alarm 510 causing an "Outage" 524, the Severity Level of "Minor" 534, "Warning" 536, and "Info" 538 are inconsistent. Similarly, in response to the third alarm 570 causing an "Outage" 584, the Severity Level of "Info" 594, "Major" 596, and "Minor" 598 are inconsistent. In response to second alarm 540 having a Classification 552 of "Notification" 554, the Severity Level of "Major" 564, and "Critical" 566 are inconsistent.

An alarm having Classification 552 of Notification 554 does not cause a Severity Level of "Major" 564 and "Critical" 566. Classification 522, 582 of "Outage" 524, 584 is defined as having a Severity Level 532, 592 of "Critical" or "Major."

By allowing attributes, such as Classification 522, 552, 582 and Severity Level 532, 562, 592 to be defined independently, developers are able to choose inconsistent combinations. The inconsistency between alarm attributes prevents a consistent urgency level being assigned to alarms.

Figure 6:
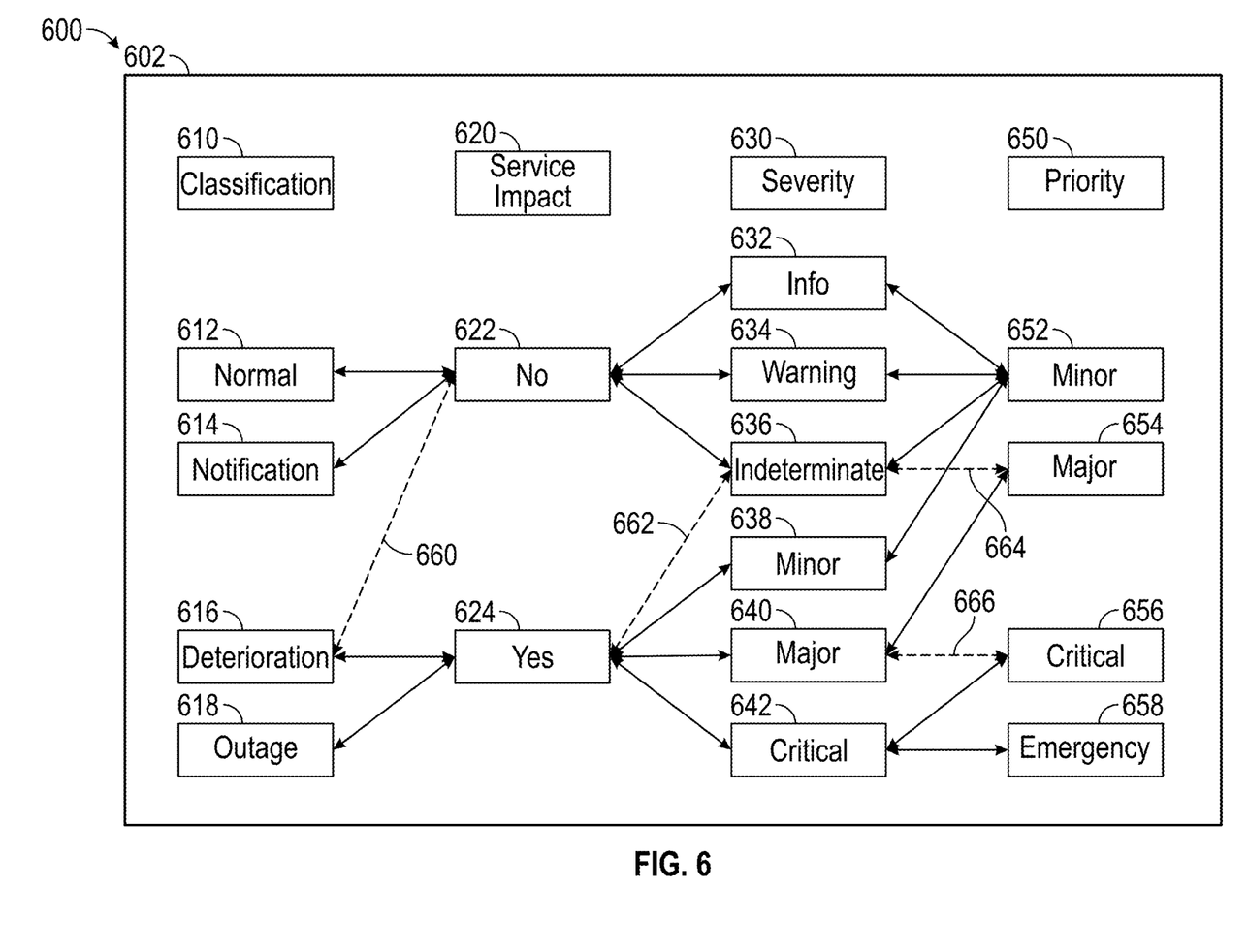
FIG. 6 illustrates a Logical Connection Tree for defining logical dependencies according to at least one embodiment.

FIG. 6 illustrates a Logical Connection Tree 600 for defining logical dependencies according to at least one embodiment.

In FIG. 6, Logical Connection Tree 600 is presented on a User Interface (UI) 602 for defining logical dependencies between the attributes ensures so that each alarm is specified with a consistent combination of attributes and that a correct urgency level of the trouble is provided as part of fault management. User Interface 602 shows a Logical Connection Tree 600 for setting values for obtained alarm attributes. In FIG. 6, User Interface 602 shows a Logical Connection Tree 600 for setting values for Classification 610, Service Impact 620, Severity 630, and Priority 650. Classification has values of "Normal" 612, "Notification" 614, "Deterioration" 616, and ""Outage" 618. For Classification 610 of "Normal" 612 and "Notification" 614, a value for Service Impact 620 is defined as "No" 622. For Classification 610 of "Deterioration" 616 and "Outage", a value for Service Impact 620 is defined as "Yes" 624. Thus, a Classification 610 of "Normal" 612 and "Notification" 614, is prevented from having a value for Service Impact 620 of "Yes" 624. Likewise, a Classification 610 of "Deterioration" 616 and "Outage" is prevented from having a value for Service Impact 620 of "No" 622.

In response to an alarm not being associated with a Service Impact 620 (i.e., "No" 622), a value for the Severity Level 630 is defined as "Info" 632, "Warning" 634, and "Indeterminate" 636. In response to an alarm being associated with a Service Impact 620 (i.e., "Yes" 624), a value for the Severity Level 630 is defined as "Minor" 638, "Major" 640, and "Critical" 642. Thus, in response to an alarm not being associated with a Service Impact 620 (i.e., "No" 622), a value for the Severity Level 630 is prevented from having a value of "Minor" 638, "Major" 640, and "Critical" 642. Similarly, in response to an alarm being associated with a Service Impact 620 (i.e., "Yes" 624), a value for the Severity Level 630 is prevented from having a value of "Info" 632, "Warning" 634, and "Indeterminate" 636.

Alarms having a Severity Level 630 of "Info" 632 and "Warning" 634 are defined as being able to have a value for Priority 650 of "Minor" 652. Alarms having a Severity Level 630 of "Indeterminate" 636 and "Minor" 638 are defined as being able to have a value for Priority 650 of "Minor" 652. Alarms having a Severity Level 630 of "Major" 640 is defined as being able to have a value for Priority 650 of "Major" 654. Alarms having a Severity Level 630 of "Critical" 642 is defined as being able to have a value for Priority 650 of "Critical" 656 and "Emergency" 658. Thus, logical dependency between the attributes as defined in the Logical Connection Tree 600 ensures that each alarm is specified with the consistent combination of attributes and that a correct urgency level of the trouble is provided as part of fault management. In at least one embodiment, upon detection, alarms are automatically presented along with information associated with the logical dependencies defined between the attributes as shown in Logical Connection Tree 600.

Developers are able to define the dependencies in the Logical Connection Tree 600. For example, Logical Connection Tree 600 shows that Classification 610 of "Deterioration" 616 is able to be defined, as shown by arrow 660, as not causing a Service Impact 620. In this example, a network element that causes an alarm having a Classification 610 of "Deterioration" 616 is determined to not currently cause a Service Impact 620, but warrants monitoring for further worsening. Similarly, Logical Connection Tree 600 shows that an alarm associated with a Service Impact 620 (i.e., "Yes" 624) is able to be defined, as shown by arrow 662, as having a value for Severity Level 630 of "Indeterminate" 636. Arrow 664 shows that an alarm having a value for Severity Level 630 of "Indeterminate" 636 is able to be defined as having a value for Priority 650 of "Major" 654. Developers are able to decide that such an alarm is associated with a particularly sensitive part of the network that assigning a value for Priority 650 of "Major" 654, as shown by arrow 664, is warranted even though the alarm is associated with Severity Level 630 of "Indeterminate" 636. In another example, Logical Connection Tree 600 shows that an alarm associated with a Severity Level 630 of "Major" 640 is able to be defined, as shown by arrow 666, as having a value for Priority 650 of "Critical" 656. Accordingly, UI 602 is used by a developer to define logical dependencies between the attributes to ensure that each alarm is specified with the consistent combination of attributes and that a correct urgency level of the trouble is provided as part of fault management. The dependencies are applied to the alarm attributes of alarms to generate defined combinations of the alarm attributes for the alarms FIG. 7 illustrates a table of logical dependencies 700 set by a developer according to at least one embodiment.

Figure 7:
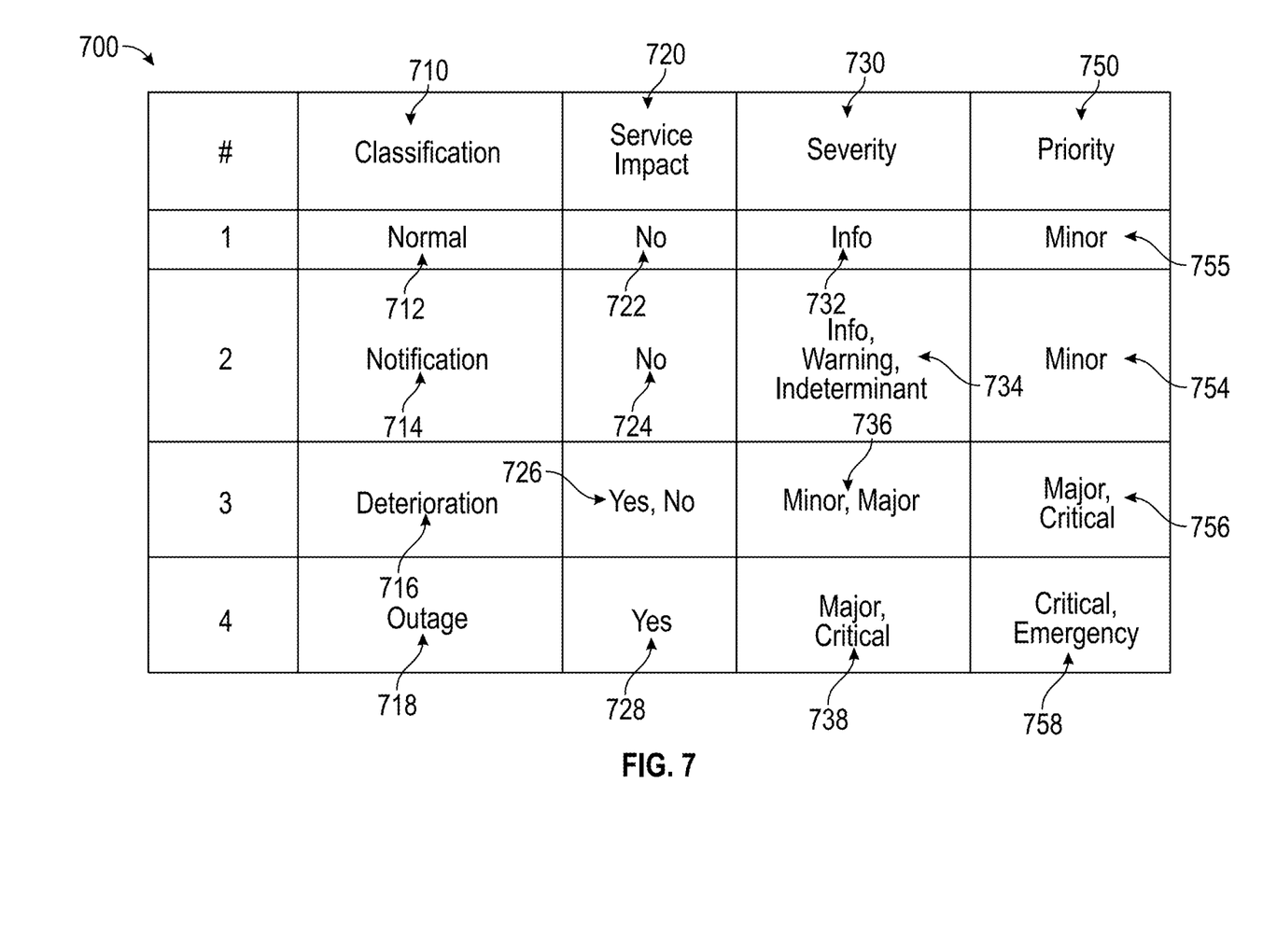
FIG. 7 illustrates a table of logical dependencies set by a developer according to at least one embodiment.

In FIG. 7, for Classification 710 of "Normal" 712, an alarm is defined as not causing a Service Impact 720 as shown by "No" 722, having a value for Severity Level 730 of "Info" 732, and a value for Priority 750 of "Minor" 752. Table 700 shows that for Classification 710 of "Notification" 714, an alarm is defined as not causing a Service Impact 720 as shown by "No" 724, having valid values for Severity Level 730 of "Info", "Warning", and Indeterminate" 734, and a value for Priority 750 of "Minor" 754.

An alarm having a Classification 710 of "Deterioration" 716 is defined as able to have a value for Service Impact 720 of "No" and "Yes" 726, having valid values for Severity Level 730 of "Minor", and "Major" 736, and values for Priority 750 of "Major" and "Critical" 756. FIG. 7 also shows that an alarm having a Classification 710 of "Outage" 718 is defined as able to have a value for Service Impact 720 of "Yes" 728, having valid values for Severity Level 730 of "Major", and "Critical" 738, and values for Priority 750 of "Critical" and "Emergency" 758.

Figure 8:
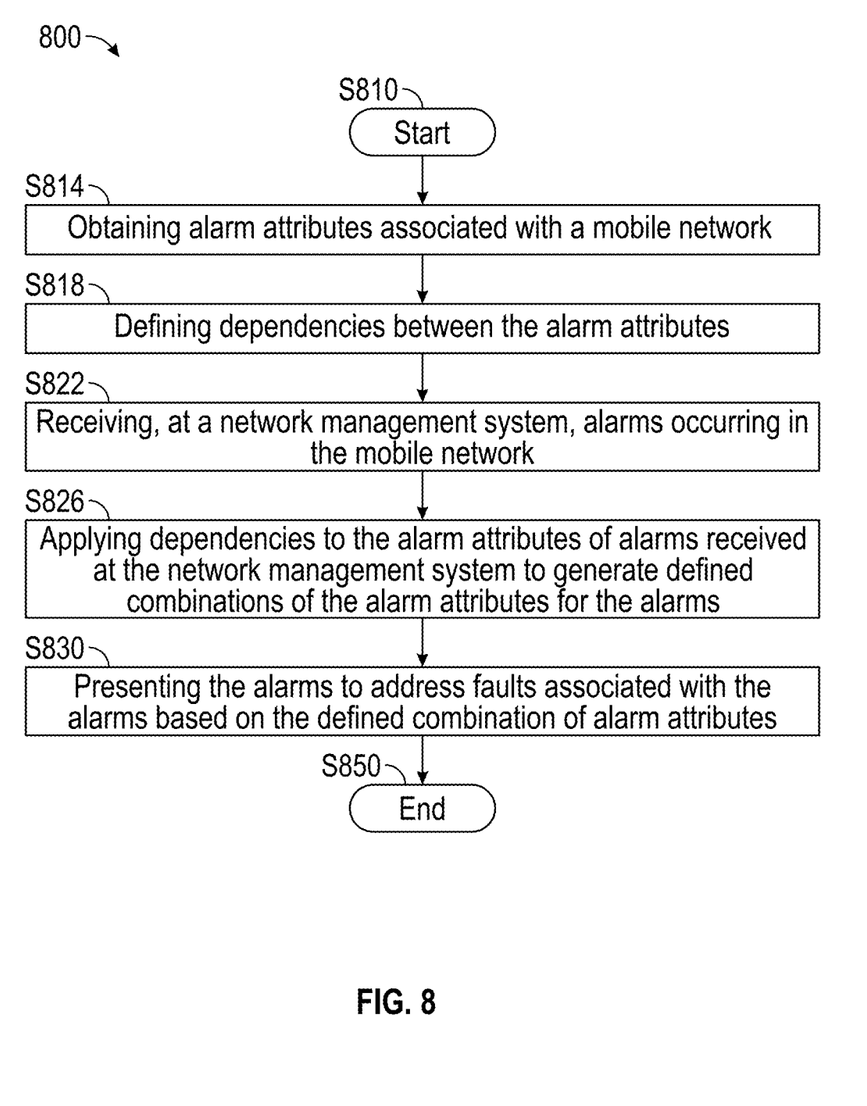
FIG. 8 is a flowchart of a method for defining logical dependency of alarm attributes according to at least one embodiment.

FIG. 8 is a flowchart 800 of a method for defining logical dependency of alarm attributes according to at least one embodiment.

In FIG. 8, method starts S810 and alarm attributes associated with a mobile network are obtained S814. Referring to FIG. 6, User Interface 602 shows a Logical Connection Tree 600 for setting values for obtained alarm attributes.

Dependencies between the alarm attributes are defined S818. Referring to FIG. 6, in response to an alarm not being associated with a Service Impact 620 (i.e., "No" 622), a value for the Severity Level 630 is defined as "Info" 632, "Warning" 634, and "Indeterminate" 636. In response to an alarm being associated with a Service Impact 620 (i.e., "Yes" 624), a value for the Severity Level 630 is defined as "Minor" 638, "Major" 640, and "Critical" 642. Thus, in response to an alarm not being associated with a Service Impact 620 (i.e., "No" 622), a value for the Severity Level 630 is prevented from having a value of "Minor" 638, "Major" 640, and "Critical" 642. Similarly, in response to an alarm being associated with a Service Impact 620 (i.e., "Yes" 624), a value for the Severity Level 630 is prevented from having a value of "Info" 632, "Warning" 634, and "Indeterminate" 636. Alarms having a Severity Level 630 of "Info" 632 and "Warning" 634 are defined as being able to have a value for Priority 650 of "Minor" 652. Alarms having a Severity Level 630 of "Indeterminate" 636 and "Minor" 638 are defined as being able to have a value for Priority 650 of "Minor" 652. Alarms having a Severity Level 630 of "Major" 640 is defined as being able to have a value for Priority 650 of "Major" 654. Alarms having a Severity Level 630 of "Critical" 642 is defined as being able to have a value for Priority 650 of "Critical" 656 and "Emergency" 658.

At a network management system, alarms occurring in the mobile network are received S822. NM 210 receives alarm attributes that are used to classify alarms. NM 210 classifies alarms are classified according to classification, service impact, severity, and priority.

Dependencies are applied to the alarm attributes of alarms received at the network management system to generate defined combinations of the alarm attributes for the alarms S826. Referring to FIG. 6, UI 602 is used by a developer to define logical dependencies between the attributes to ensure that each alarm is specified with the consistent combination of attributes and that a correct urgency level of the trouble is provided as part of fault management. The dependencies are applied to the alarm attributes of alarms to generate defined combinations of the alarm attributes for the alarms.

The alarms are presented to address faults associated with the alarms based on the defined combination of alarm attributes S830. In at least one embodiment, alarms are automatically presented upon detection. Referring to FIG. 3, the Alarm Management User Interface 300 includes an Alarm List UI 310, a Categorization/Impact of Alarms UI 320, a Network Topology Map 360, and Analysis of An Alarm UI 370. In response to receiving an alarm, the alarm is added to an alarm table. The Categorization/Impact of Alarms UI 320 provides information associated with alarms for diagnosing and addressing issues associated with the alarms. The Network Topology Map 360 provides ides a visual map of your network's physical topology, including the network devices and the links that connect them. Analysis of An Alarm UI 370 presents detailed information associated with an alarm.

The process then ends S850.

At least one embodiment of defining logical dependency of alarm attributes includes obtaining alarm attributes associated with a mobile network, defining dependencies between the alarm attributes, receiving, at a network management system, alarms occurring in the mobile network, applying dependencies to the alarm attributes of alarms received at the network management system to generate defined combinations of the alarm attributes for the alarms, and presenting the alarms to address faults associated with the alarms based on the defined combination of alarm attributes.

Figure 9:
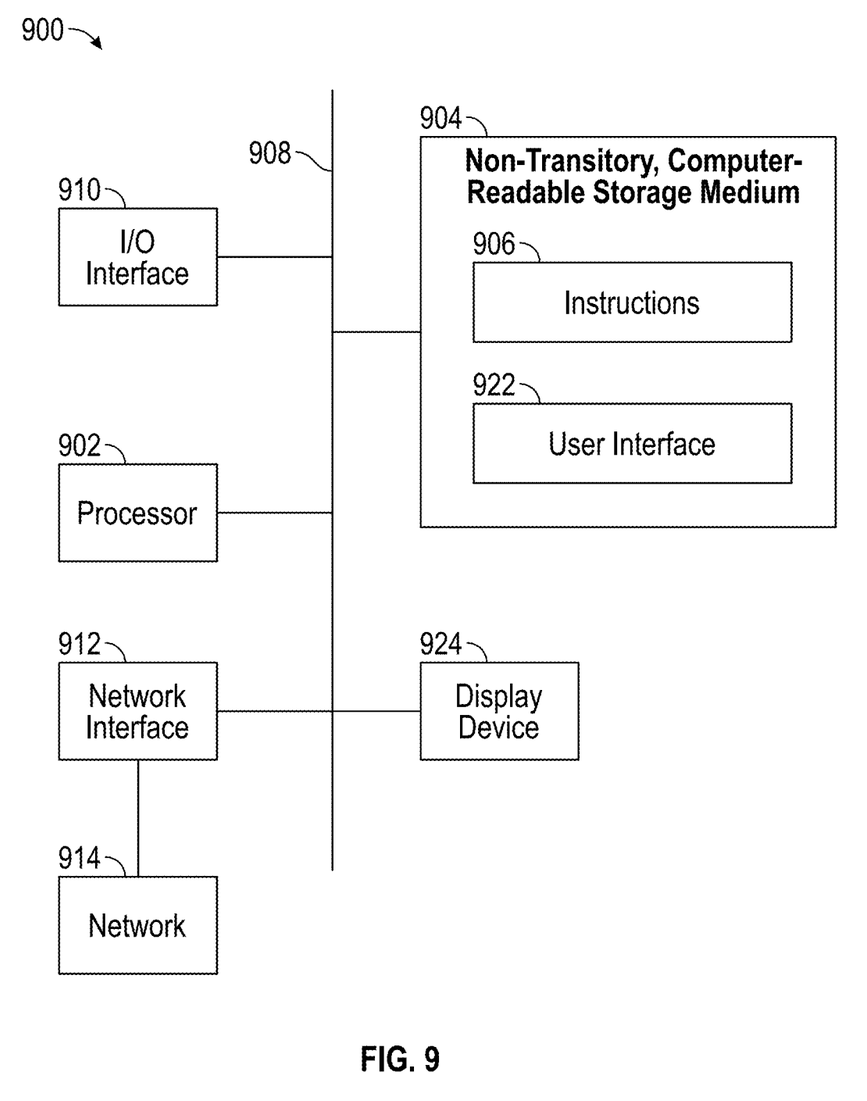
FIG. 9 is a high-level functional block diagram of a processor-based system 900 according to at least one embodiment.

FIG. 9 is a high-level functional block diagram of a processor-based system 900 according to at least one embodiment.

In at least one embodiment, processing circuitry 900 defines logical dependencies between alarm attributes. Processing circuitry 900 implements application of logical dependencies to alarm attributes using processor 902. Processing circuitry 900 also includes a non-transitory, computer-readable storage medium 904 that is used to implement application of logical dependencies to alarm attributes. Storage medium 904, amongst other things, is encoded with, i.e., stores, instructions 906, i.e., computer program code that are executed by processor 902 causes processor 902 to perform operations for defining dependencies for alarm attributes. Execution of instructions 906 by processor 902 represents (at least in part) an application which implements at least a portion of the methods described herein in accordance with one or more embodiments (hereinafter, the noted processes and/or methods).

Processor 902 is electrically coupled to computer-readable storage medium 904 via a bus 908. Processor 902 is electrically coupled to an Input/output (I/O) interface 910 by bus 908. A network interface 912 is also electrically connected to processor 902 via bus 908. Network interface 912 is connected to a network 914, so that processor 902 and computer-readable storage medium 904 connect to external elements via network 914. Processor 902 is configured to execute instructions 906 encoded in computer-readable storage medium 904 to cause processing circuitry 900 to be usable for performing at least a portion of the processes and/or methods. In one or more embodiments, processor 902 is a Central Processing Unit (CPU), a multi-processor, a distributed processing system, an Application Specific Integrated Circuit (ASIC), and/or a suitable processing unit.

Processing circuitry 900 includes I/O interface 910. I/O interface 910 is coupled to external circuitry. In one or more embodiments, I/O interface 910 includes a keyboard, keypad, mouse, trackball, trackpad, touchscreen, and/or cursor direction keys for communicating information and commands to processor 902.

Processing circuitry 900 also includes network interface 912 coupled to processor 902. Network interface 912 allows processing circuitry 900 to communicate with network 914, to which one or more other computer systems are connected. Network interface 912 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 964.

Processing circuitry 900 is configured to receive information through I/O interface 910. The information received through I/O interface 910 includes one or more of instructions, data, design rules, libraries of cells, and/or other parameters for processing by processor 902. The information is transferred to processor 902 via bus 908. Processing circuitry 900 is configured to receive information related to a User Interface (UI) 922 through I/O interface 910. The information is stored in computer-readable medium 904 as UI 922. UI 922 is presented on Display Device 924 to enable logical dependencies between alarm attributes to be defined and for presenting the alarms so that faults associated with the alarms based on the defined combination of alarm attributes are able to be identified and addressed. In at least one embodiment alarms are automatically presented by UI 922 on Display Device 924. In addition, or alternatively, an alert is automatically generated based on the information associated with the alarm. The alert is able to be presented by UI 922 on Display Device 924.

In one or more embodiments, one or more non-transitory computer-readable storage media 904 having stored thereon instructions (in compressed or uncompressed form) that are used to program a computer, processor, or other electronic device) to perform processes or methods described herein. The one or more non-transitory computer-readable storage media 904 include one or more of an electronic storage medium, a magnetic storage medium, an optical storage medium, a quantum storage medium, or the like. For example, the computer-readable storage media includes, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more non-transitory computer-readable storage media 904 includes a Compact Disk-Read Only Memory (CD-ROM), a Compact Disk-Read/Write (CD-R/W), and/or a Digital Video Disc (DVD).

In one or more embodiments, storage medium 904 stores computer program code 906 configured to cause processing circuitry 900 to perform at least a portion of the processes and/or methods for defining logical dependencies between alarm attributes. In one or more embodiments, storage medium 904 also stores information, such as algorithm which facilitates performing at least a portion of the processes and/or methods for defining dependencies for alarm attributes. Accordingly, in at least one embodiment, the processor circuitry 900 performs a method for defining dependencies for alarm attributes. The process includes obtaining alarm attributes associated with a mobile network, defining dependencies between the alarm attributes, receiving, at a network management system, alarms occurring in the mobile network, applying dependencies to the alarm attributes of alarms received at the network management system to generate defined combinations of the alarm attributes for the alarms, and presenting the alarms to address faults associated with the alarms based on the defined combination of alarm attributes. The process for defining dependencies for alarm attributes provides the advantages, via defining logical dependencies between the attributes, of ensuring that each alarm is specified with the consistent combination of attributes and that a correct urgency level of the trouble is provided as part of fault management. The logical dependency in attributes also allows automation initiatives to be implemented to provide improved alarm management.

In at least one embodiment, separate instances of these programs are executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above are able to be utilized in a variety of devices, environments, and situations.

Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for defining logical dependency of alarm attributes, comprising:
    obtaining alarm attributes associated with a mobile network;
    defining dependencies between the alarm attributes;
    receiving, at a network management system, alarms occurring in the mobile network;
    applying dependencies to the alarm attributes of the alarms received at the network management system to generate defined combinations of the alarm attributes for the alarms; and
    presenting the alarms to address faults associated with the alarms based on the defined combination of the alarm attributes.

2. The method of claim 1, wherein the obtaining the alarm attributes includes obtaining a classification associated with at least one alarm, an indication of service impact associated with the at least one alarm, a severity associated with the at least one alarm, and a priority associated with the at least one alarm.

3. The method of claim 2, wherein the obtaining the classification associated with the at least one alarm includes an indication of normal operation of the mobile network, a notification about the operation of the network, an indication of deterioration of the mobile network, and an indication of outage of the mobile network.

4. The method of claim 2, wherein the obtaining the indication of the service impact associated with the at least one alarm includes obtaining one of an indication that the at least one alarm impacts service of the mobile network and an indication that the at least one alarm does not impact service of the mobile network.

5. The method of claim 2, wherein the obtaining the severity associated with the at least one alarm includes obtaining one of an indication that the alarm is associated with information, a warning about operation of the mobile network, an indeterminate indication, an indication that the alarm is associated with a minor issue, an indication that the alarm is associated with a major issue, and an indication that the alarm is associated with a critical issue.

6. The method of claim 2, wherein the obtaining the priority associated with the at least one alarm includes obtaining one of an indication that the alarm is to be given a minor priority, an indication that the alarm is to be given a major priority, an indication that the alarm is to be given a critical priority, and an indication that the alarm is to be given an emergency priority.

7. The method of claim 1, wherein the defining dependencies between the alarm attributes includes at least one of:
    defining a service impact attribute associated with at least one alarm that indicates the at least one alarm causes a service impact to be dependent on a classification attribute, wherein the classification attribute is associated with one of deterioration of the mobile network and outage of the mobile network, and to be dependent on a severity attribute, wherein the severity attribute is associated with one of minor severity, major severity, and critical severity;
    defining the service impact attribute associated with the at least one alarm that indicates the at least one alarm does not cause the service impact to be dependent on the classification attribute, wherein the classification attribute is associated with one of normal operation of the mobile network and a notification about the mobile network, and to be dependent on the severity attribute, wherein the severity attribute is associated with one of information about the mobile network, a warning about operation of the mobile network, and an indeterminate indication;

defining a priority attribute that indicates the at least one alarm is of minor priority to be dependent on the severity attribute, wherein the severity attribute is associated with one of an indication that the alarm is associated with the information about the mobile network, the warning about the operation of the mobile network, an indeterminate indication, and an indication that the alarm is associated with a minor issue;

defining the severity attribute indicating the at least one alarm is of a major priority to be dependent on the severity attribute associated with the major severity; and defining the severity attribute indicating the at least one alarm is of a critical priority to be dependent on the severity attribute associated with one of the critical severity and an emergency severity.

8. A device for defining logical dependency of alarm attributes, comprising:
a memory storing computer-readable instructions; and
a processor connected to the memory, wherein the processor is configured to execute the computer-readable instructions to:
obtain alarm attributes associated with a mobile network;
define dependencies between the alarm attributes;
receive, at a network management system, alarms occurring in the mobile network;
apply dependencies to the alarm attributes of the alarms received at the network management system to generate defined combinations of the alarm attributes for the alarms; and
present the alarms to address faults associated with the alarms based on the defined combination of the alarm attributes.

9. The device of claim 8, wherein the processor is further configured to obtain the alarm attributes by obtaining a classification associated with at least one alarm, an indication of service impact associated with the at least one alarm, a severity associated with the at least one alarm, and a priority associated with the at least one alarm.

10. The device of claim 9, wherein the classification associated with the at least one alarm includes an indication of normal operation of the mobile network, a notification about the operation of the network, an indication of deterioration of the mobile network, and an indication of outage of the mobile network.

11. The device of claim 9, wherein the indication of the service impact associated with the at least one alarm includes one of an indication that the at least one alarm impacts service of the mobile network and an indication that the at least one alarm does not impact service of the mobile network.

12. The device of claim 9, wherein the severity associated with the at least one alarm includes one of an indication that the alarm is associated with information, a warning about operation of the mobile network, an indeterminate indication, an indication that the alarm is associated with a minor issue, an indication that the alarm is associated with a major issue, and an indication that the alarm is associated with a critical issue.

13. The device of claim 9, wherein the priority associated with the at least one alarm includes one of an indication that the alarm is to be given a minor priority, an indication that the alarm is to be given a major priority, an indication that the alarm is to be given a critical priority, and an indication that the alarm is to be given an emergency priority.

14. The device of claim 8, wherein the processor is further configured to define dependencies between the alarm attributes according to at least one of:
defining a service impact attribute associated with at least one alarm that indicates the at least one alarm causes a service impact to be dependent on a classification attribute, wherein the classification attribute is associated with one of deterioration of the mobile network and outage of the mobile network, and to be dependent on a severity attribute, wherein the severity attribute is associated with one of minor severity, major severity, and critical severity;

defining the service impact attribute associated with the at least one alarm that indicates the at least one alarm does not cause the service impact to be dependent on the classification attribute, wherein the classification attribute is associated with one of normal operation of the mobile network and a notification about the mobile network, and to be dependent on the severity attribute, wherein the severity attribute is associated with one of information about the mobile network, a warning about operation of the mobile network, and an indeterminate indication;

defining a priority attribute that indicates the at least one alarm is of minor priority to be dependent on the severity attribute, wherein the severity attribute is associated with one of an indication that the alarm is associated with the information about the mobile network, the warning about the operation of the mobile network, an indeterminate indication, and an indication that the alarm is associated with a minor issue;

defining the severity attribute indicating the at least one alarm is of a major priority to be dependent on the severity attribute associated with the major severity; and defining the severity attribute indicating the at least one alarm is of a critical priority to be dependent on the severity attribute associated with one of the critical severity and an emergency severity.

15. A non-transitory computer-readable media having computer-readable instructions stored thereon, which in response to being executed by a processor causes the processor to perform operations comprising:
obtaining alarm attributes associated with a mobile network;
defining dependencies between the alarm attributes;
receiving, at a network management system, alarms occurring in the mobile network;
applying dependencies to the alarm attributes of the alarms received at the network management system to generate defined combinations of the alarm attributes for the alarms; and
presenting the alarms to address faults associated with the alarms based on the defined combination of the alarm attributes.

16. The non-transitory computer-readable media of claim 15, wherein the obtaining the alarm attributes includes obtaining a classification associated with at least one alarm, an indication of service impact associated with the at least one alarm, a severity associated with the at least one alarm, and a priority associated with the at least one alarm.

17. The non-transitory computer-readable media of claim 16, wherein the obtaining the classification associated with the at least one alarm includes an indication of normal operation of the mobile network, a notification about the operation of the network, an indication of deterioration of the mobile network, and an indication of outage of the mobile network.

18. The non-transitory computer-readable media of claim 16, wherein the obtaining the indication of the service impact associated with the at least one alarm includes obtaining one of an indication that the at least one alarm impacts service of the mobile network and an indication that the at least one alarm does not impact service of the mobile network, and wherein the obtaining the severity associated with the at least one alarm includes obtaining one of an indication that the alarm is associated with information, a warning about operation of the mobile network, an indeterminate indication, an indication that the alarm is associated with a minor issue, an indication that the alarm is associated with a major issue, and an indication that the alarm is associated with a critical issue.

19. The non-transitory computer-readable media of claim 16, wherein the obtaining the priority associated with the at least one alarm includes obtaining one of an indication that the alarm is to be given a minor priority, an indication that the alarm is to be given a major priority, an indication that the alarm is to be given a critical priority, and an indication that the alarm is to be given an emergency priority.

20. The non-transitory computer-readable media of claim 15, wherein the defining dependencies between the alarm attributes includes at least one of:

defining a service impact attribute associated with at least one alarm that indicates the at least one alarm causes a service impact to be dependent on a classification attribute, wherein the classification attribute is associated with one of deterioration of the mobile network and outage of the mobile network, and to be dependent on a severity attribute, wherein the severity attribute is associated with one of minor severity, major severity, and critical severity;

defining the service impact attribute associated with the at least one alarm that indicates the at least one alarm does not cause the service impact to be dependent on the classification attribute, wherein the classification attribute is associated with one of normal operation of the mobile network and a notification about the mobile network, and to be dependent on the severity attribute, wherein the severity attribute is associated with one of information about the mobile network, a warning about operation of the mobile network, and an indeterminate indication;

defining a priority attribute that indicates the at least one alarm is of minor priority to be dependent on the severity attribute, wherein the severity attribute is associated with one of an indication that the alarm is associated with the information about the mobile network, the warning about the operation of the mobile network, an indeterminate indication, and an indication that the alarm is associated with a minor issue;

defining the severity attribute indicating the at least one alarm is of a major priority to be dependent on the severity attribute associated with the major severity; and defining the severity attribute indicating the at least one alarm is of a critical priority to be dependent on the severity attribute associated with one of the critical severity and an emergency severity.

\* \* \* \* \*